United States Patent
Thomas et al.

(10) Patent No.: US 12,054,041 B2
(45) Date of Patent: Aug. 6, 2024

(54) WHEEL HUB CLUTCH, WHEEL HUB, WHEEL END SYSTEM, AXLE, DRIVETRAIN, AND VEHICLE

(71) Applicants: Means Industries, Inc., Saginaw, MI (US); Consolidated Metco, Inc., Vancouver, WA (US)

(72) Inventors: Steven M. Thomas, Saginaw, MI (US); David Hacker, Bad Axe, MI (US); Pavan Dunna, Camas, WA (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 18/279,908

(22) PCT Filed: Jul. 29, 2022

(86) PCT No.: PCT/US2022/038804
§ 371 (c)(1),
(2) Date: Sep. 1, 2023

(87) PCT Pub. No.: WO2023/048826
PCT Pub. Date: Mar. 30, 2023

(65) Prior Publication Data
US 2024/0051385 A1 Feb. 15, 2024

Related U.S. Application Data

(60) Provisional application No. 63/247,171, filed on Sep. 22, 2021.

(51) Int. Cl.
*B60K 17/02* (2006.01)
*B60B 27/04* (2006.01)
(Continued)

(52) U.S. Cl.
CPC .......... *B60K 17/02* (2013.01); *B60B 27/047* (2013.01); *B60K 7/0007* (2013.01); *B60K 17/35* (2013.01);
(Continued)

(58) Field of Classification Search
CPC ........ B60K 17/02; B60K 17/35; B60K 23/08; B60B 27/047; F16D 41/04
See application file for complete search history.

(56) References Cited

U.S. PATENT DOCUMENTS 2,839,889 A * 6/1958 McGill ................. F16H 61/462
418/43
2,854,111 A 9/1958 Simonsen
(Continued)

FOREIGN PATENT DOCUMENTS

CN 104290596 A 1/2015

OTHER PUBLICATIONS

Means Technical Update—CTI Berlin, Transforming the Future of Propulsion, 2020, 27 pages.
(Continued)

*Primary Examiner* — Kevin Hurley
*Assistant Examiner* — Michael R Stabley
(74) *Attorney, Agent, or Firm* — Reising Ethington P.C.

(57) ABSTRACT

A wheel hub clutch includes: a notch plate; a pocket plate having pockets and plunger passages in communication with the pockets; locking members carried in the pocket plate pockets; and plungers carried in the pocket plate plunger passages and configured to drive the locking members into engagement with the notches in the notch plate. The clutch also may include a translator with a permanent magnet that cooperates with an electromagnet of a stator to translate the translator. The translator may be coupled to the locking members to translate them into and out of engagement with (Continued)

the notch plate. Also disclosed is a wheel end system including the wheel hub clutch, a drivetrain including the wheel end system and wheel hub clutch, and a vehicle including the drivetrain.

30 Claims, 11 Drawing Sheets

(51) Int. Cl.
    *B60K 7/00*         (2006.01)
    *B60K 17/35*       (2006.01)
    *B60K 17/36*       (2006.01)
    *B60K 23/08*       (2006.01)
    *F16D 27/00*       (2006.01)
    *F16D 27/14*       (2006.01)
    *F16D 41/04*       (2006.01)

(52) U.S. Cl.
    CPC .............. *B60K 17/36* (2013.01); *B60K 23/08* (2013.01); *F16D 27/004* (2013.01); *F16D 27/14* (2013.01); *F16D 41/04* (2013.01)

(56) References Cited

U.S. PATENT DOCUMENTS

| | | | |
|---|---|---|---|
| 3,150,532 A | 9/1964 | Bixby | |
| 4,625,846 A | 12/1986 | Gomez | |
| 4,986,608 A | 1/1991 | Fett | |
| 5,044,479 A | 9/1991 | Petrak | |
| 5,141,088 A | 8/1992 | Kurihara et al. | |
| 5,148,901 A | 9/1992 | Kurihara et al. | |
| 5,257,682 A | 11/1993 | Kuroki | |
| 5,429,204 A | 7/1995 | Tuholski | |
| 6,109,411 A | 8/2000 | Bigley | |
| 6,189,668 B1 * | 2/2001 | Richards | F16D 31/08 180/383 |
| 6,422,369 B1 | 7/2002 | McCalla | |
| 6,612,390 B2 | 9/2003 | Bennett et al. | |
| 7,096,990 B2 | 8/2006 | Borgen et al. | |
| 8,398,520 B1 | 3/2013 | Bassi | |
| 9,091,307 B2 | 7/2015 | Feusse et al. | |
| 9,457,657 B2 | 10/2016 | Ziech et al. | |
| 9,784,321 B2 | 10/2017 | Pritchard | |
| 9,950,562 B2 * | 4/2018 | Forrest | B60K 17/046 |
| 10,724,580 B2 | 7/2020 | Averill et al. | |
| 10,731,715 B2 | 8/2020 | Heravi et al. | |
| 10,801,556 B2 | 10/2020 | Eschenburg et al. | |
| 10,844,913 B2 | 11/2020 | Boudreau et al. | |
| 10,926,632 B2 | 2/2021 | De Lemos | |
| 10,926,633 B2 | 2/2021 | Frenznick et al. | |
| 10,955,013 B2 | 3/2021 | Yoder et al. | |
| 11,286,996 B2 | 3/2022 | Pawley et al. | |
| 2016/0280066 A1 | 9/2016 | Tavvala | |
| 2019/0331173 A1 | 10/2019 | Eschenburg et al. | |
| 2020/0200209 A1 | 6/2020 | Coyne et al. | |
| 2020/0340534 A1 | 10/2020 | Yu | |
| 2021/0129582 A1 | 5/2021 | Regan et al. | |
| 2021/0246950 A1 | 8/2021 | Pawley et al. | |

OTHER PUBLICATIONS

International Written Opinion for Application No. PCT/US2022/038804, dated Dec. 16, 2022, 5 pages.
International Search Report for Application No. PCT/US2022/038804, dated Dec. 16, 2022, 4 pages.

* cited by examiner

WHEEL HUB CLUTCH, WHEEL HUB, WHEEL END SYSTEM, AXLE, DRIVETRAIN, AND VEHICLE

CROSS-REFERENCE TO RELATED APPLICATION

This application is a National Stage of International Application No. PCT/US2022/038804, filed Jul. 29, 2022, and claims the benefit of U.S. Provisional Application No. 63/247,171 filed Sep. 22, 2021, the contents of which is incorporated herein by reference in its entirety.

TECHNICAL FIELD

This disclosure relates generally to vehicles and, more particularly, to drivetrains of vehicles, axles and wheel end systems of drivetrains, and wheel hubs and wheel hub clutches of wheel end systems.

BACKGROUND

Wheeled vehicles include wheels and one or more prime movers, like an internal combustion engine and/or an electric motor, to rotatably drive the wheels. Some such vehicles may drive the wheels directly with an electric motor. Other such vehicles also or instead may include a drivetrain located between the prime mover and the wheels and including an axle to change drive rotation from a longitudinal direction along a length of the vehicle to a transverse direction. The latter vehicles also may include a drive shaft coupled to an input side of the axle and axle shafts extending transversely away from the axle and coupled to the wheels. Some vehicles further may include multiple sets of wheels and multiple axles, usually two rear axles and two sets of wheels driven via the axles. In any case, all such wheels include wheel hubs that couple the wheels (e.g., wheel rim and tire mounted on the rim) to a drivetrain axle shaft or an electric motor shaft. Some wheel hubs include wheel hub clutches configured to disconnect (and reconnect) wheels from a prime mover, for example, to improve fuel economy when a vehicle with multiple driven rear axles is traveling at highway speeds, or to convert a vehicle from four-wheel-drive mode to two-wheel-drive mode. But currently available wheel hub clutches may be too bulky or costly, or of poor quality or reliability.

BRIEF SUMMARY

An illustrative embodiment of a wheel hub clutch includes a notch plate, a pocket plate having pockets and plunger passages in communication with the pockets, locking members carried in the pocket plate pockets, and plungers carried in the pocket plate plunger passages and configured to drive the locking members into engagement with the notches in the notch plate. The clutch also may include a translator with a permanent magnet that cooperates with an electromagnet of a stator to translate the translator. The translator may be coupled to the locking members to translate them into and out of engagement with the notch plate. Other disclosed embodiments include a wheel end system including the aforementioned wheel hub clutch or another wheel hub clutch, a drivetrain including the wheel end system and wheel hub clutch(es), and a vehicle including the drivetrain.

DETAILED DESCRIPTION

In general, a wheel hub clutch will be described using one or more examples of illustrative embodiments of a multi-axle drivetrain that includes primary and secondary rear axles for tractive drive wheels of a truck. The example embodiment(s) will be described with reference to use in trucks or tractors, for example, class 8 tractors. However, it will be appreciated as the description proceeds that the invention is useful in many different applications and may be implemented in many other embodiments. In this regard, and as used herein and in the claims, it will be understood that the term vehicle refers not only to commercial truck applications, but also to passenger vehicle applications, agricultural vehicle applications, military vehicle applications, or any other vehicle applications, regardless of whether the vehicle includes an undriven front axle and/or one or more driven rear axles. Similarly, the term axle includes structure that rotatably supports wheels on a vehicle, including an axle housing to couple the axle to structural members of the vehicle, wheel hubs configured to be removably fixed to the wheels, and spindles to rotatably support the wheel hubs with respect to the axle housing.

In contrast to complex conventional wheel hub clutches, the present disclosure includes a relatively simple wheel hub clutch configured to allow a wheel hub to be operatively engaged and disengaged from an axle of a driveline of a vehicle. The presently disclosed wheel hub clutch includes a selectively rotatable notch plate including a plurality of notches and a wheel hub mounting portion radially outward of the plurality of notches. The wheel hub clutch also includes a rotatable pocket plate selectively engageable with the selectively rotatable notch plate and including a plurality of pockets corresponding to the plurality of notches of the selectively rotatable notch plate, and a plurality of plunger passages in communication with the plurality of pockets. The wheel hub clutch further includes a plurality of locking members in the plurality of pockets of the pocket plate and selectively engageable with the plurality of notches of the selectively rotatable notch plate. The novelty of the wheel hub clutch and wheel hub lend novelty to a wheel end system, axle, and drivetrain, all including the novel wheel hub clutch. Also presently disclosed are novel drivetrain configurations that facilitate advancements in drivetrain efficiencies and that may use the presently disclosed wheel hub clutch and/or other wheel hub clutches.

Figure 1:
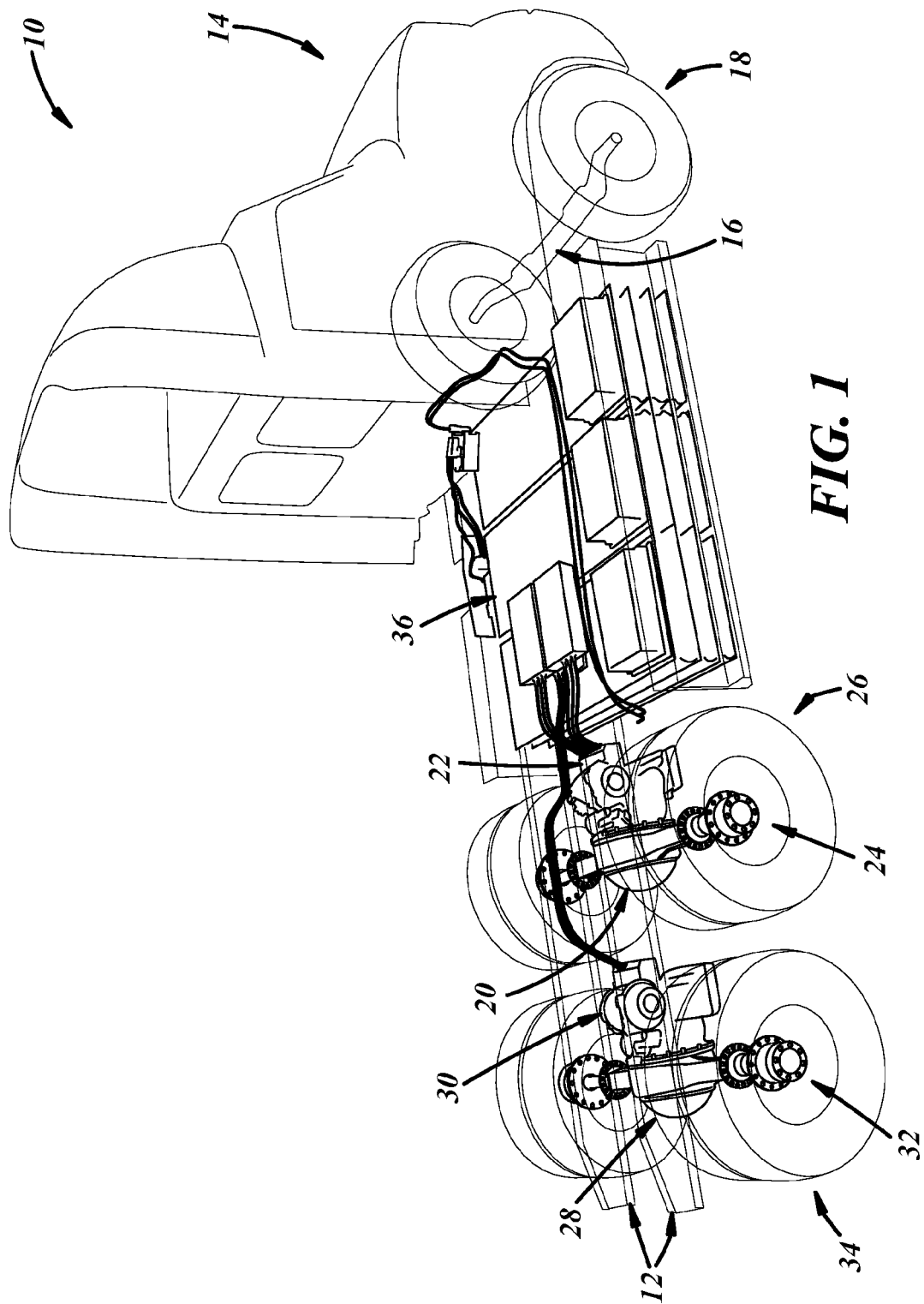
FIG. 1 is a perspective view according to an illustrative embodiment of a truck according to the present disclosure and including conventional wheel end systems, including conventional wheel end hubs, according to the prior art and new wheel end systems, including new wheel end hubs, according to the present disclosure.

With specific reference now to the drawings, FIG. 1 shows an illustrative embodiment of a vehicle, for example, a truck 10, that may be electrically powered and may include a chassis 12, a cab or body 14 that may be carried by a forward portion of the chassis 12, an undriven front axle 16 coupled to the forward portion of the chassis 12, and front wheels 18 carried by the front axle 16. The truck 10 also includes at least one driven rear axle that may include a primary rear axle 20 coupled to a rearward portion of the chassis 12, a primary electric motor 22 drivingly coupled to the primary rear axle 20, conventional wheel hubs 24 coupled to the primary rear axle 20, and primary rear wheels 26 coupled to the conventional wheel hubs 24. Similarly, the at least one rear axle further may include a secondary rear axle 28 coupled to a rearward portion of the chassis 12, a secondary electric motor 30 drivingly coupled to the secondary rear axle 28, presently disclosed new wheel hubs 32 coupled to the secondary rear axle 28, and secondary rear wheels 34 coupled to the new wheel hubs 32. Notably, axial lengths of the new wheel hubs 32 are longer than that of the conventional wheel hubs 24 but are shorter than axial overhangs of wheel rims of the secondary rear wheels 34 with which the hub 32 are used such that the hubs 32 fit axially within the wheel rim overhangs and, thus, do not protrude axially beyond the wheel rims of the wheels 34. Further, the truck 10 includes a power supply 36 that is used to power the primary and secondary electric motors 22, 30, and may be carried by the chassis 12 between the front axle 16 and the rear axles 20, 28, and may include batteries, fuel cells, or the like, and power conditioners, power transformers, or the like.

As will be described in greater detail below, the new wheel hubs 32 include a novel arrangement of wheel hub clutches for decoupling the secondary rear wheels 34 from the secondary rear axle 28 to allow freewheeling of the rear wheels 34. The truck 10 may include a drivetrain at least partially constituted by one or both of the rear axles 20, 28 and one or both of the wheel hubs 24, 32. Likewise, the truck 10 may include a powertrain constituted by one or both of the electric motors 22, 30, and the drivetrain coupled to one or both of the electric motors 22, 30. In other embodiments, the primary rear axle 20 may include the new wheel hubs 32 instead of the conventional wheel hubs 24.

Figure 2:
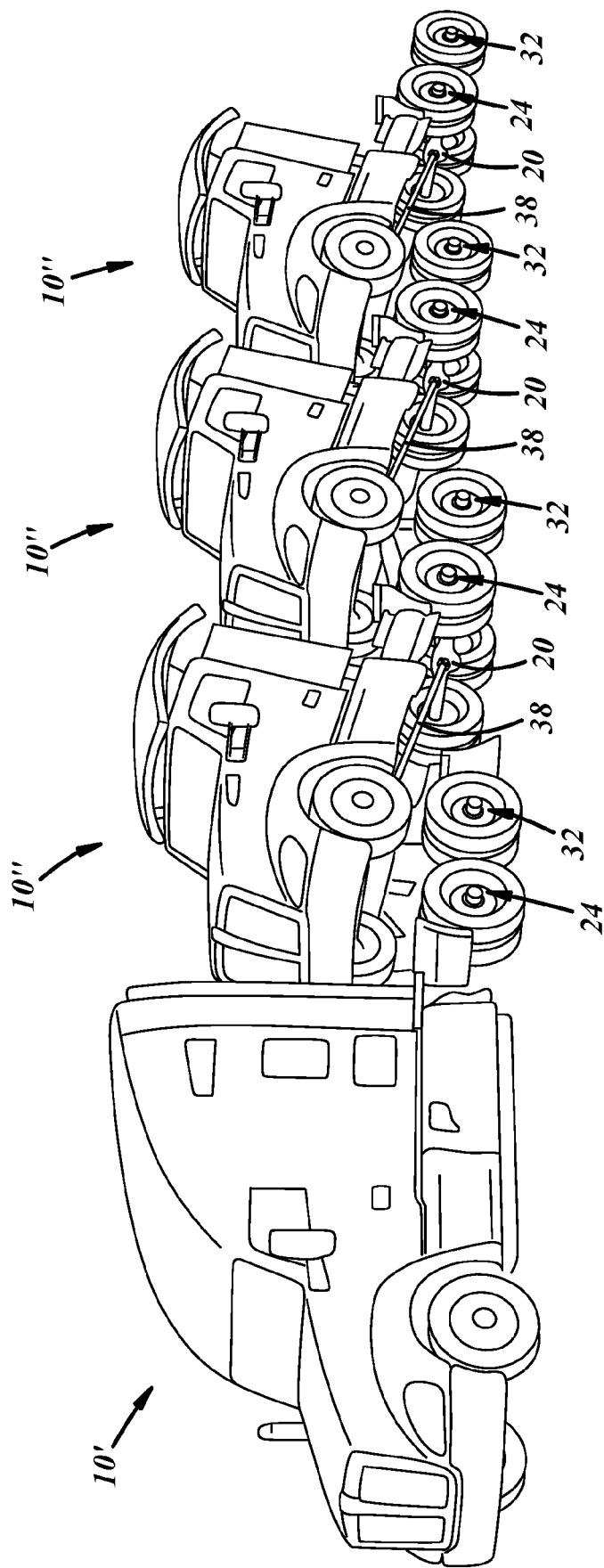
FIG. 2 is a perspective view of another truck according to the present disclosure and shown towing additional trucks according to the present disclosure and including the conventional wheel end systems, including conventional wheel end hubs, according to the prior art and the new wheel end systems, including new wheel end hubs, according to the present disclosure.

Similarly, with reference to FIG. 2, the new wheel hubs 32 may be used with another illustrative embodiment of a vehicle, for instance, another truck 10' that may be internal combustion engine powered and is shown towing additional trucks 10" that also may be powered by internal combustion engines (not shown). Each of the trucks 10', 10" is similar to the electric motor powered truck 10 of FIG. 1, except that each truck 10', 10" may include the internal combustion engine to drive a prop shaft 38 drivingly coupled to at least one rear axle, for example, the primary rear axle 20. The trucks 10', 10" may have multiple rear axles, including the primary rear axle 20 and a secondary rear axle (not shown). The engine (not shown) may provide the power to drive both the primary rear axle 20 and the secondary rear axle (not shown) via the primary rear axle, or the engine (not shown) may provide the power to drive only the primary rear axle 20, and another prime mover, for instance, an electric motor (not shown) may provide power to drive the secondary rear axle (not shown). The trucks 10', 10" may include drivetrains at least partially constituted by the rear axles and one or both of the wheel hubs 24, 32. Likewise, the trucks 10', 10" may include powertrains constituted by the internal combustion engines (not shown) and/or electric motors (not shown), one or more transmissions (not shown) coupled to the engines, and the drivetrain coupled to the engines and/or electric motors via the transmissions. As will become apparent from the description below, the new wheel hubs 32 allow one or more additional trucks 10" to be towed by the truck 10' without having to manually remove or disengage axle shafts from the drivetrain as is conventionally done. Additionally, and as will be described in further detail herein below, the new wheel hubs 32 allow the wheels 34 to be decoupled from the drivetrains at highway speeds for better fuel economy.

Figure 3:
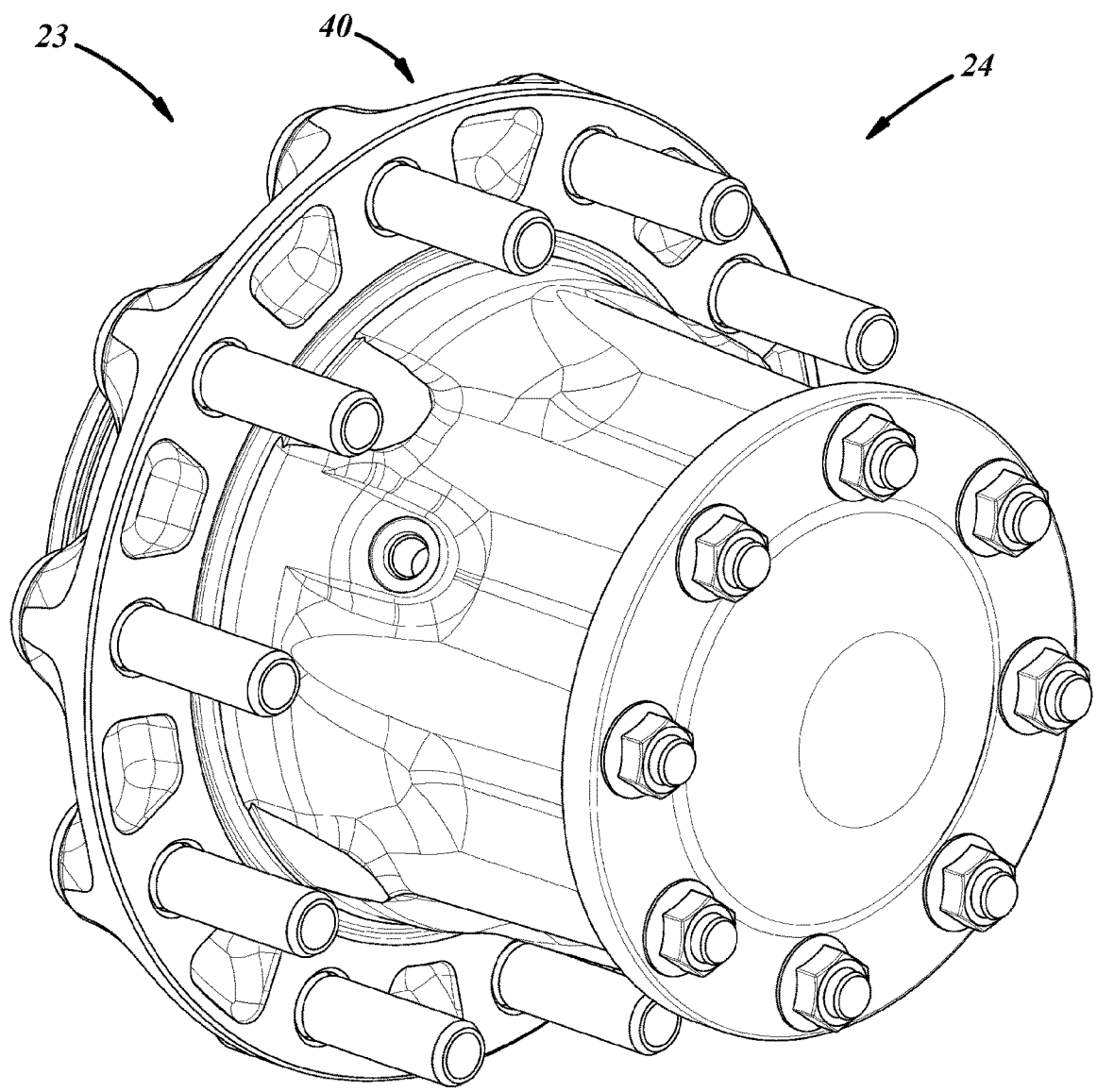
FIG. 3 is a perspective view of a conventional wheel end system, including a conventional wheel end hub, according to the prior art.
Figure 4:
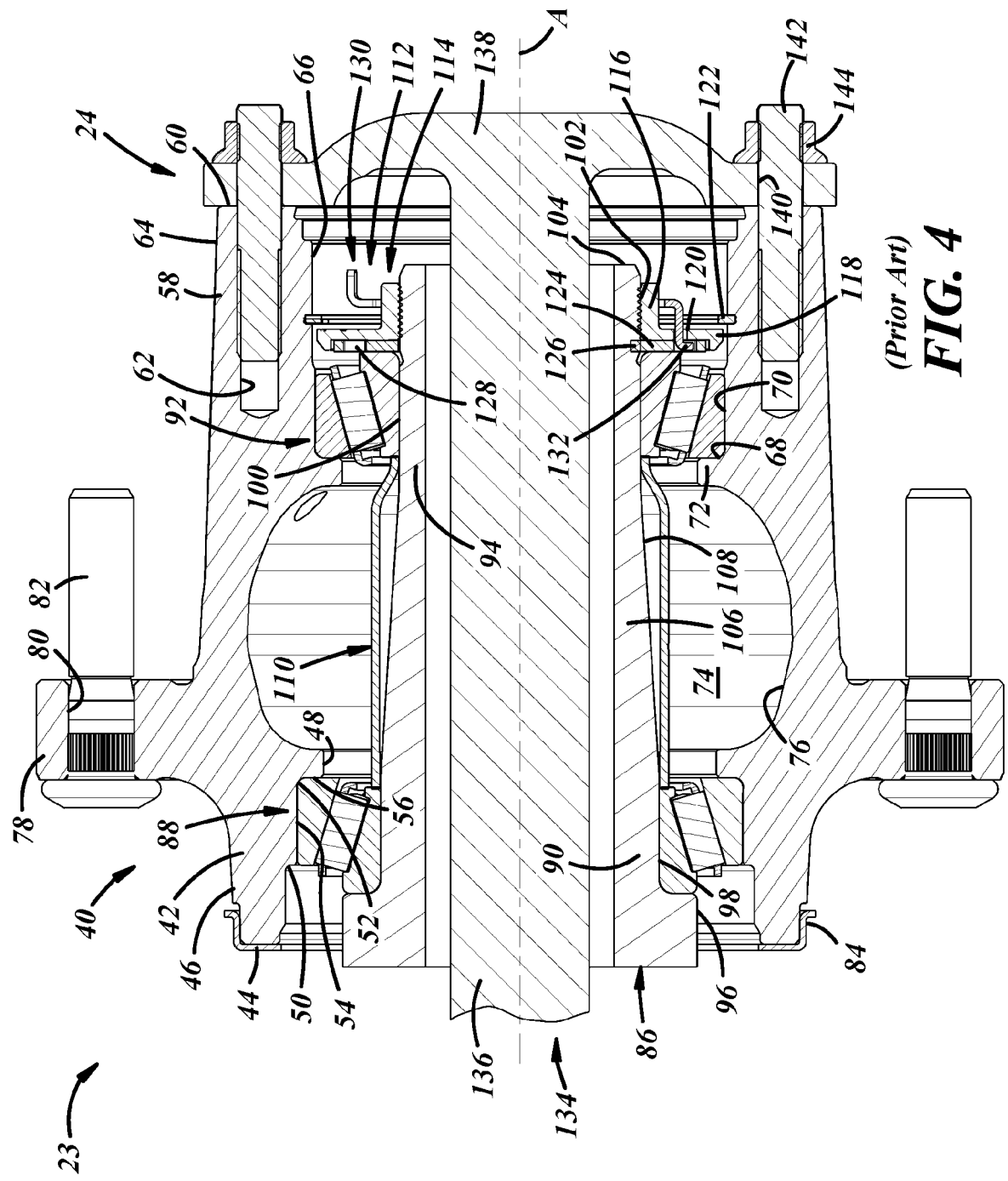
FIG. 4 is a longitudinal sectional view of the conventional wheel end system, including the conventional wheel end hub, of FIG. 3.

With reference to prior art FIGS. 3 and 4, one or more of several presently disclosed drivetrains may include a conventional wheel end system 23 including the conventional wheel hub 24 including a hub body 40. With reference now to FIG. 4, the hub body 40 may include a hub inboard portion 42 with a hub inboard facing surface 44, a hub inboard exterior surface 46 extending in a direction away from the inboard facing surface 44, and a hub inboard interior surface 48 extending in a direction away from the inboard facing surface 44 and including a seal pocket 50 and an inboard bearing pocket 52 including an inboard bearing journal 54 and an inboard bearing flange 56 extending transversely inwardly. The hub body 40 also may include a hub outboard portion 58 with a hub outboard facing surface 60 having fastener passages 62 therein, a hub outboard exterior surface 64 extending in a direction away from the outboard facing surface 60, and a hub outboard interior surface 66 extending in a direction away from the outboard facing surface 60 and having an outboard bearing pocket 68 including an outboard bearing journal 70 and an outboard bearing flange 72 extending transversely inwardly. The hub body 40 also may include or establish a spindle passage 74 extending between the inboard and outboard portions 42, 58 along an axis A that extends longitudinally and about which components rotate, and may include a grease cavity 76 between the inboard and outboard bearing flanges 56, 72. The hub body 40 further may include a hub flange 78 extending transversely, for example, radially, outwardly from the exterior surfaces 46, 64 of the wheel hub body 40 and having wheel fastener passages 80 extending therethrough, for accepting wheel fasteners or lugs 82 therethrough and configured to be fastened to lug nuts (not shown) to couple wheel rims (not shown) to the hub body 40.

The wheel hub 24 also may include a speed sensor ring 84 coupled to the inboard facing surface 44 of the inboard portion 42 of the wheel hub body 40, a spindle 86 extending into and through at least a portion of the spindle passage 74 of the wheel hub body 40, an inboard bearing 88 around a spindle inboard portion 90 of the spindle 86 and carried in the inboard bearing pocket 52 of the inboard portion 42 of the wheel hub body 40 of the wheel hub 24, and an outboard bearing 92 around a spindle outboard portion 94 of the spindle 86 and carried in the outboard bearing pocket 68 of the outboard portion 58 of the wheel hub body 40 of the wheel hub 24. The spindle 86 may be hollow and may include the spindle inboard portion 90 having an inboard bearing shoulder 96 and an inboard exterior surface extending in a direction away from the inboard bearing shoulder 96 and establishing an inboard bearing journal 98. The spindle 86 also may include the spindle outboard portion 94 having an outboard exterior surface establishing an outboard bearing journal 100, and a spindle nut diameter 102 having spindle nut engagement features, for example, threads, and terminating in a spindle outboard facing surface 104 that is axially recessed with respect to the wheel hub outboard facing surface 60, and a spindle intermediate portion 106 having a tapered exterior surface 108. The wheel hub 24 further may include a bearing spacer 110 located between the inboard and outboard bearings 88, 92.

The wheel hub 24 additionally may include a spindle nut system 112 axially outboard of the outboard bearing 92 and coupled to the spindle 86. The spindle nut system 112 may include a spindle nut 114 having a hub 116 with an internal cylindrical portion having spindle engagement features, for instance, internal threads, coupled to the spindle nut engagement features of the spindle 86, and an external wrench flat portion having a lock ring groove (not shown). The spindle nut 114 also has a lock washer flange 118 extending transversely outwardly from the hub 116 and having a lock ring relief 120 therein. The spindle nut system 112 also may include a retainer, for example, a nut retaining spiral snap ring 122, coupled to the hub outboard portion 58 of the wheel hub 24 via an annular groove in the outboard interior surface 66 of the outboard portion 58 of the wheel hub 24 to trap the lock washer flange 118 of the spindle nut 114 between the snap ring 122 and the outboard bearing 92. The spindle nut system 112 further may include a lock washer 124 trapped between the lock washer flange 118 of the spindle nut 114 and the outboard bearing 92 and having a spindle engagement feature, for instance, a radially inwardly extending tooth 126, and a circumferential array of lock ring apertures 128. The spindle nut system 112 additionally may include a lock ring 130 trapped in the lock ring groove of the wrench flat portion of the spindle nut 114 and having a lock washer engagement feature 132, for instance, a tang or tooth, extending through the lock ring relief 120 and into one of the lock ring apertures 128 of the lock washer 124. The spindle nut system 112 may include more or less than all of the aforementioned components of the system 112, for example, the system 112 may include only the spindle nut 114.

The wheel end system 23 further may include an axle shaft 134 including a shaft portion 136 extending through the hollow spindle 86 along the axis A and including an outboard portion 138 with hub body engagement features. The shaft portion 136 may be hollow, or of solid cylindrical shape as shown, and the outboard portion 138 may include a radially continuous flange extending radially outwardly from the shaft portion 136. The engagement features of the outboard portion may include fastener passages 140 configured to accept bolts therethrough for threading to the hub body, or threaded studs 142 threaded to the hub body and nuts 144 threaded to the studs 142, to trap the axle shaft outboard portion 138 between the nuts 144 and the hub body 40 as shown.

Figure 5:
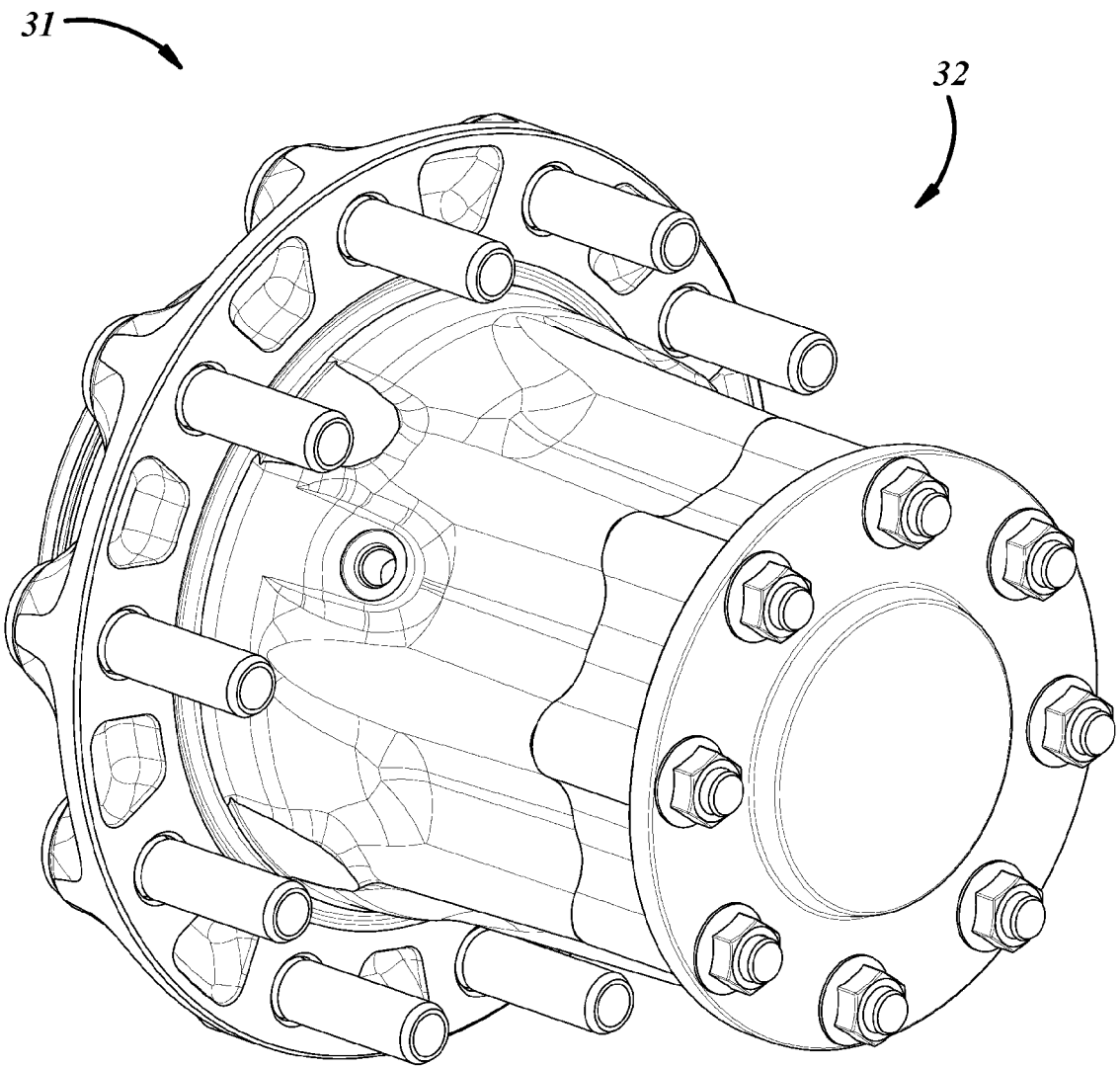
FIG. 5 is a perspective view of a new wheel end system, including a new wheel end hub, according to an illustrative embodiment of the present disclosure.
Figure 6:
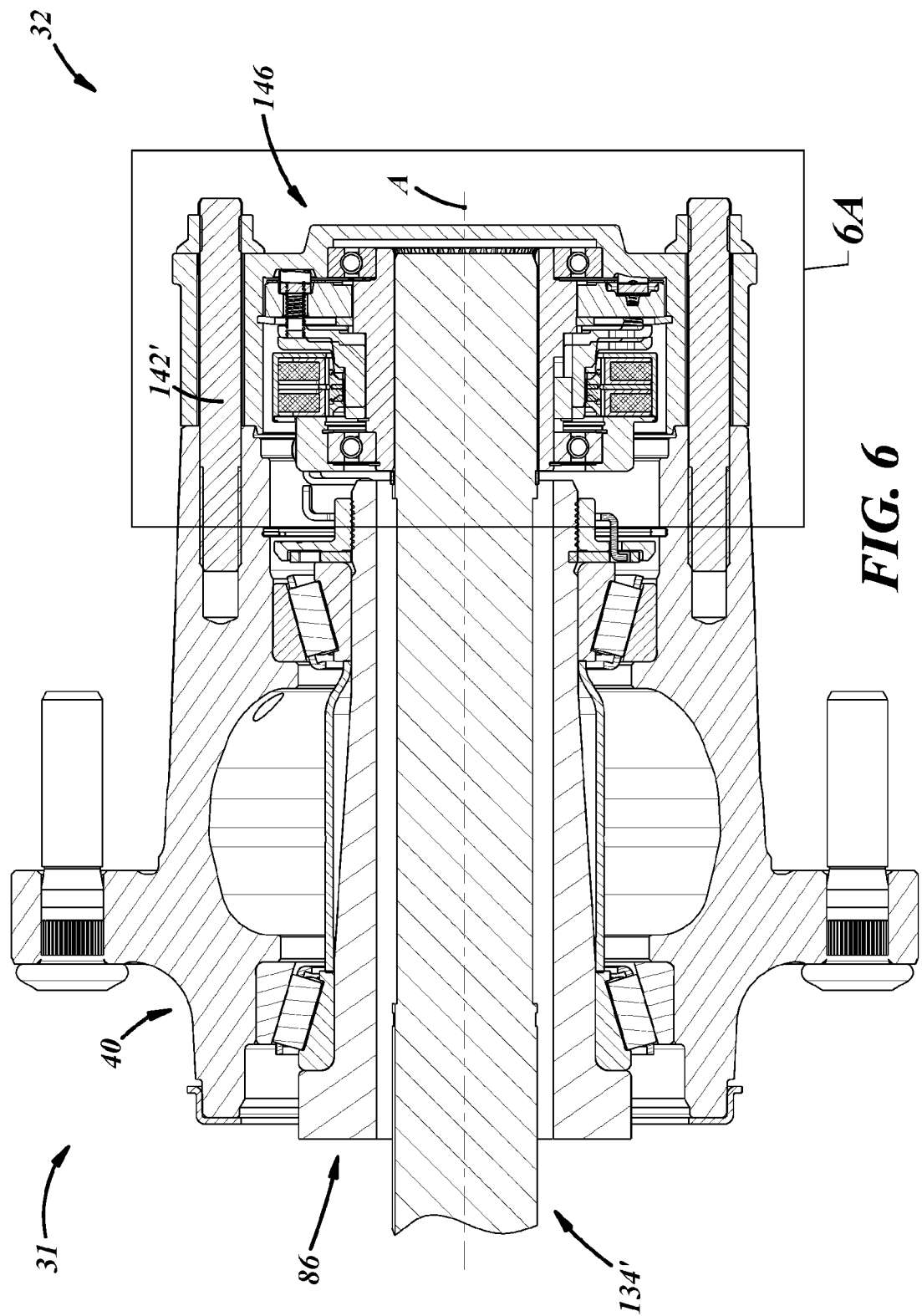
FIG. 6 is a longitudinal sectional view of the presently disclosed new wheel end system, including the new wheel end hub, of FIG. 5.

With reference now to FIGS. 5 and 6, the drivetrain may include the new wheel end system 31 according to the present disclosure and including the new wheel hub 32 including the spindle 86. With reference now to FIG. 6, the new wheel hub 32 may include all of the components of the conventional wheel hub of FIG. 4 except for the flanged axle shaft 134 thereof, and instead using a flangeless axle shaft 134', and also including a wheel hub clutch 146 having components that are rotatable about the axis A about which the axle shaft 134' rotates and releasably couples the axle shaft 134' and the wheel hub body 40. The wheel end system design of the present disclosure can be retrofit to conventional wheel hub bodies, wherein threaded bolts or studs 142" are longer than the conventional studs 142 (FIG. 4) and are used to couple the wheel hub clutch 146 to the wheel hub body 40.

Figure 6A:
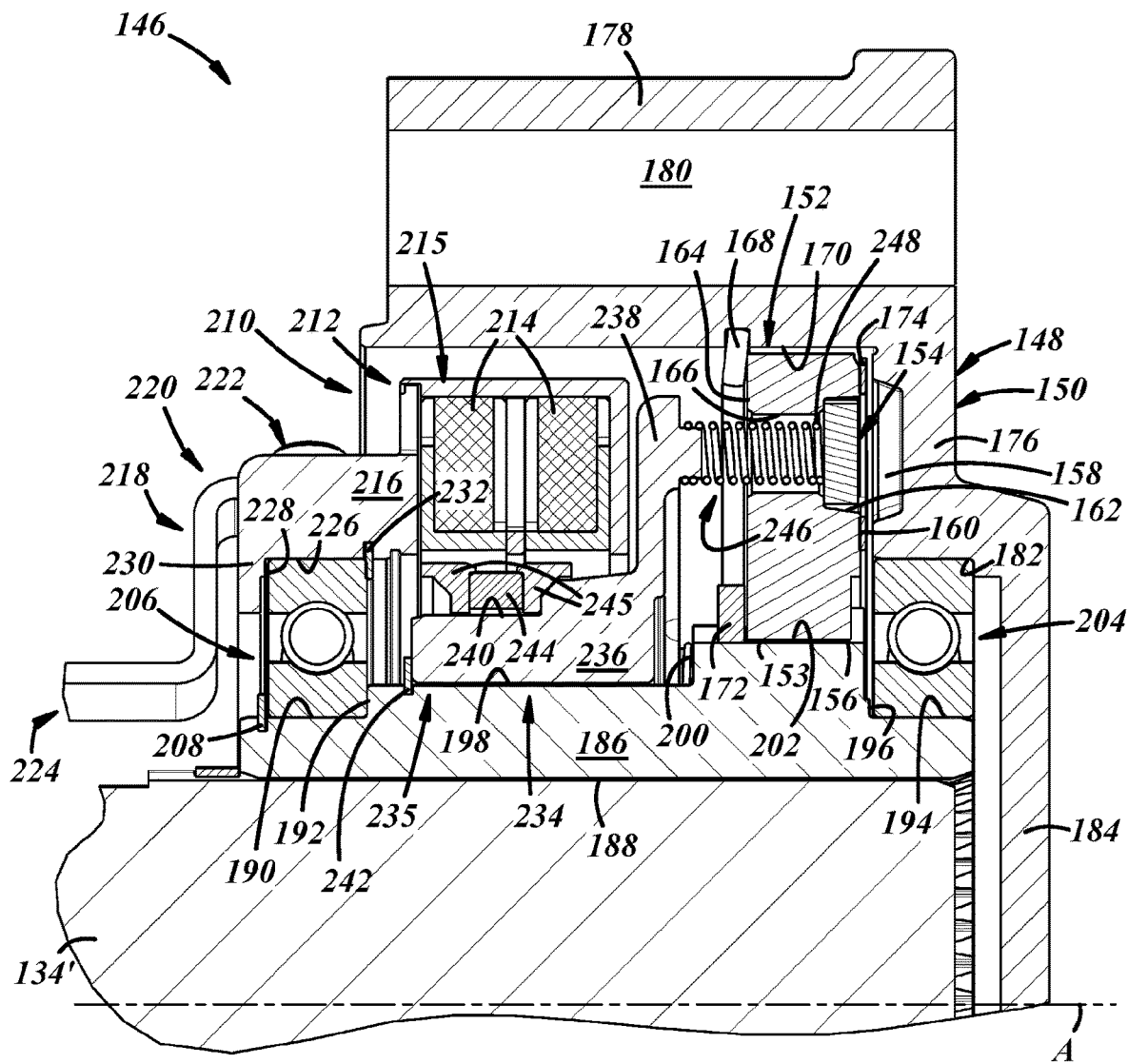
FIG. 6A is an enlarged view of an outboard portion of the new wheel end system, including the new wheel end hub, taken from rectangle 6A of FIG. 6, and illustrating a wheel hub clutch in a disengaged state.

With reference now to FIG. 6A, the wheel hub clutch 146 may include a coupling and control assembly that may be similar to that disclosed in US 2021/0246950, which is assigned to the assignee hereof and is incorporated herein by reference in its entirety. The coupling and control assembly includes a coupling subassembly or assembly 148, including a first coupling member 150 selectively rotatable about the rotational axis A, a second coupling member 152 rotatable about the rotational axis A, and a plurality of locking members 154 to transmit torque between the first and second coupling members 140, 142. The first coupling member 150 may be a notch plate and may include a first face 156 having a plurality of locking features, for example, notches 158. The second coupling member 152 may be axially retained with respect to the first coupling member 150, may be a pocket plate, and may include a second face 160 in opposition to the first face 156 of the first coupling member 150 and having a plurality of pockets 162, and a third face 164 spaced from the second face 160 and having a plurality of passages 166 in communication with the plurality of pockets 162. The locking members 154 may be struts, for example, seesaw or teeter-totter shaped struts, or struts of any other shape and/or configuration suitable for use with the other components. When engaged to the first and second coupling members 150, 152, the locking members 154 prevent relative rotation of the coupling members 150, 152 with respect to each other in at least one direction about the axis A. The locking members 154, notches 158, and pockets 162 may be configured in an array, for example, circumferentially spaced, for instance, equidistantly, around the axis A.

The wheel hub clutch 146 further may include a retainer ring or retainer, for example, an annular snap ring 168, that may be carried in a corresponding groove in an interior surface 170 of the first coupling member 150 to axially retain the second coupling member 152 to the first coupling member 150. Likewise, the wheel hub clutch 146 also may include another retaining ring or retainer, for example, an annular snap ring 172 that may be carried in a corresponding groove or trapped behind a shoulder or the like. The wheel hub clutch 146 additionally may include an aperture plate 174 disposed between the first and second coupling members 150, 152 and having apertures corresponding to the notches 158 and the pockets 162 and having edges about which the locking members 154 may pivot into and out of engagement with the notches 148.

The first coupling member 150 includes a notch plate portion 176 carrying the set of notches 158, and a mounting cylinder portion 178 radially outward of the notch plate portion 176 and also extending axially away therefrom in an axially inboard direction and having fastener passages 180 extending therethrough. Also, the first coupling member 150 includes an outboard bearing pocket 182 radially inward of the notch plate portion 176, and a hub cover portion 184 radially inward of the notch plate portion 176 and extending radially continuously across the rotational axis A.

With continued reference to FIG. 6A, the wheel hub clutch 146 also includes a clutch hub 186 fixed against rotation to the second coupling member 152 and configured to be fixed against rotation to the axle shaft 134', for example, via splined or keyed connections. The clutch hub 186 includes an interior surface 188 with axle shaft engagement features engaged with the clutch hub engagement features of the axle shaft to fix the clutch hub 186 to the axle shaft 134'. The clutch hub 186 also has an inboard bearing journal 190 and an inboard bearing shoulder 192, and an outboard bearing journal 194 and an outboard bearing shoulder 196, and a translator journal 198 and a translator shoulder 200 axially between the inboard and outboard bearing shoulders 190, 196. The clutch hub 186 further may include an enlarged diameter 202 between the translator journal 198 and the outboard bearing shoulder 196 and having second coupling member engagement features, which may include external splines. Of course, the second coupling member 152 has an inner diameter 153 with clutch hub engagement features, for example, internal splines, engaged to the second coupling member engagement features against rotation.

The wheel hub clutch 146 further includes an outboard bearing 204 carried by the outboard bearing journal 194 radially between the clutch hub 186 and the first coupling member 150 and axially between the outboard bearing shoulder 196 and the outboard bearing pocket 182 of the first coupling member 150. The wheel hub clutch 146 also includes an inboard bearing 206 carried by the inboard bearing journal 190 axially between the inboard bearing shoulder 192 and a snap ring 208 carried in a groove in the bearing journal 190.

The wheel hub clutch 146 includes the aforementioned coupling and control assembly which additionally includes a control subassembly or assembly 210 that may be carried by the clutch hub 186. The control assembly 210 includes a stator 212 including at least one electromagnetic source, for example, an electromagnet including electromagnetically inductive coils 214 carried between fingers of a ferromagnetic housing 215. In other embodiments, the electromagnetic source may include any suitable structure to produce a magnetic field suitable for use with the wheel hub clutch 146.

The control assembly 210 also includes a stator support 216 disposed radially outwardly from the clutch hub 186 and being coupled to the spindle 86 (FIG. 6) against rotation. For example, the stator support 216 may be coupled to the spindle 86 (FIG. 6) via a bracket 218 having an outboard portion 220 that may be welded, fastened (as shown) with a fastener 222, interference fit, interengaged, or otherwise coupled to the stator support 216, and also having an inboard portion 224 that may be welded, fastened, interference fit, interengaged, or otherwise coupled to the spindle 86 (FIG. 6). The stator support 216 includes an outboard portion coupled to a corresponding inboard portion of the stator 212 by welding, fastening, interengagement, or any other suitable coupling configuration to thereby hold the stator 212 against rotation. The stator support 216 also includes an interior bearing pocket including a bearing journal 226 and a bearing shoulder 228. The inboard bearing 206 may be axially trapped between a radially inwardly extending lip 230 of the stator support 216 and a retainer, for example, a snap ring 232, carried in an internal groove of the stator support 216. The control assembly 210 also may include the inboard bearing 206 carried between the inboard bearing journal 190 radially between the clutch hub 186 and the stator support 216.

With continued reference to FIG. 6A, the control assembly 210 further may include a translator 234 rotatable about the rotational axis A and coupled to the clutch hub 186 to be rotatable therewith and with the second coupling member 152, and translatable along the rotational axis A. The translator 234 may include a translator hub 235 having a main body 236 and a plunger flange 238 extending radially outwardly from the main body 236 at an outboard portion of the main body 236. The main body 236 may include an interior surface that may be internally splined but slidable along the translator journal 198 of the clutch hub 186, wherein the translator journal 198 may be externally splined. The main body 236 also may include an exterior surface including a permanent magnet journal 240 at an inboard portion of the main body 236. Also, a translator stop, for example, an annular snap ring 242, may be carried in a corresponding groove in the translator journal 198 of the clutch hub 186 to axially locate the translator hub main body 236 with respect to stator 212, and between the snap ring 242 and the enlarged diameter 202 of the clutch hub 186. The translator 234 also includes a permanent magnetic source, for example, a permanent magnet 244, carried by the translator hub 235 and that cooperates with the at least one electromagnet coil 214 of the stator 212 to translate the translator 234. The permanent magnet 244 may be carried by an intermediate carrier 245 that may be interference fit, welded, interengaged, or otherwise coupled to the main body 236 of the translator 234 in any suitable manner and may include ferromagnetic rings on either side of the magnet 244. The translator 234 further includes plungers 246 having free end portions 248 configured to move within the passages 166 to engage the locking members 154 to actuate the locking members 154 upon translation of the translator 234 toward the first coupling member 150. The plungers 246 may include springs, for example, coiled compression springs, as illustrated, or shafts, or any other suitable plunger types.

Figure 6B:
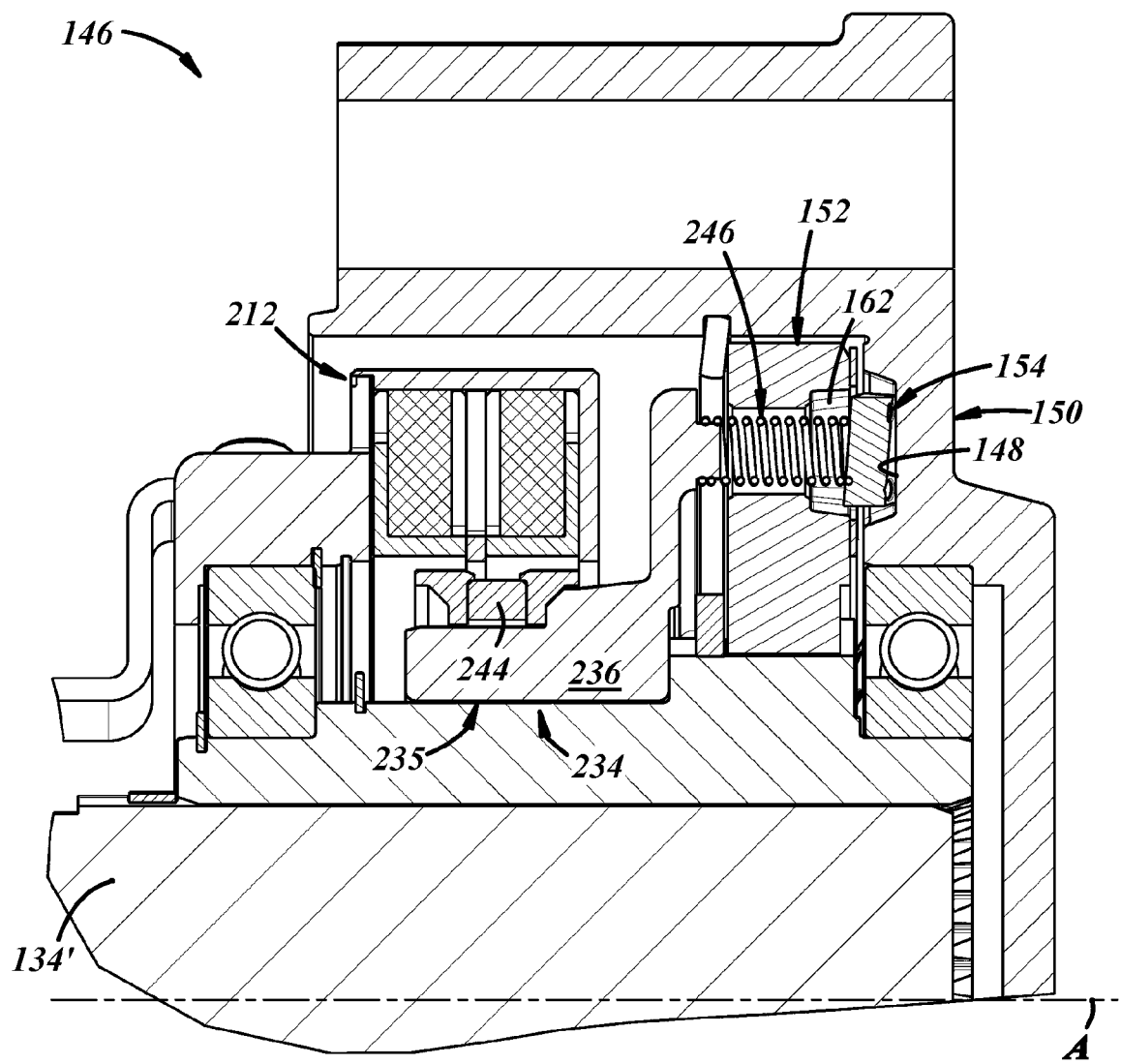
FIG. 6B is another view of the outboard portion shown in FIG. 6A, wherein the wheel hub clutch is illustrated in an engaged state.

With reference to FIG. 6B, the wheel hub clutch 146 may be activated to connect the axle shaft 134' to the wheel hub body 40 (FIG. 6). More specifically, the stator 212 may be energized to electromagnetically drive the permanent magnet 244 of the translator 234 and, thus, drive the translator hub 235 in an axial outboard direction. Although not shown, the stator 212 may be supplied with controlled power via wiring that may extend from the stator 212 into an open outboard end of the hollow spindle 86 (FIG. 6), through the hollow spindle 86 and out of the spindle 86 at or near an outboard end of the spindle 86. In any case, axially outboard movement of the hub main body 236 of the translator 234 moves the plungers 246 and, in turn, the plungers 246 move the locking members 154 from their respective pockets 162 of the second coupling member 152 into engagement with their respective notches 158 of the first coupling member 150. With reference again to FIG. 6A, the wheel hub clutch 146 may be deactivated (or activated in reverse) so that the main body 236 of the translator 234 moves in an axial inboard direction under the bias force of the plungers 246 and/or under an electromagnetic force applied by the stator 212 to the permanent magnet 244 of the translator 234. Accordingly, the locking members 154 retract from their respective notches 158 of the first coupling member 150 back into their respective pockets 162 of the second coupling member 152. Of course, to facilitate such retraction, application of torque through the axle shaft 134' may be ceased momentarily or transiently to allow the locking members 154 to disengage from the notches 158.

Figure 7:
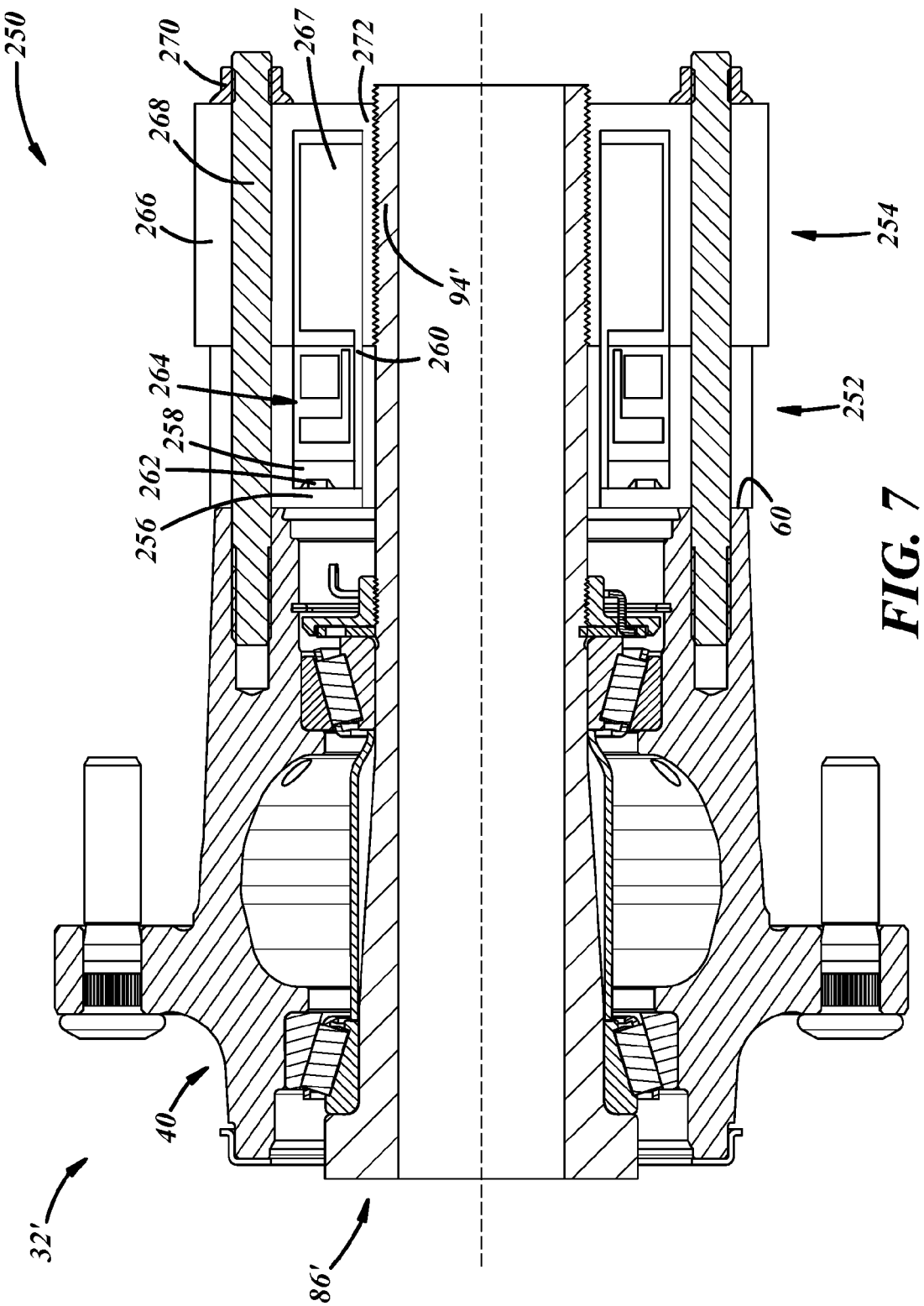
FIG. 7 is a schematic sectional view of another illustrative embodiment of another new wheel end system, including another new wheel end hub, according to the present disclosure.

With reference now to FIG. 7, another wheel end system 250 is shown in accordance with another embodiment of the present disclosure. The system 250 includes most of the wheel hub 32 of FIG. 5, except, for example, a spindle 86' is modified from the spindle 86 in FIG. 5 to be longer, extending well beyond the outboard axial end 60 of the wheel hub body 40. The system 250 additionally includes a wheel hub clutch 252 coupled to the outboard axial end 60 of the wheel hub body 40, and an electric machine 254 at an outboard end of the system 250. More specifically, the electric machine 254 is located at an outboard side of the wheel hub clutch 252 and is coupled to the wheel hub clutch 252 to drive a wheel hub 32' via selective activation of the wheel hub clutch 252.

The wheel hub clutch 252 includes a first coupling member or notch plate 256 fixed to the wheel hub body 40, a second coupling member or pocket plate 258 fixed to a rotatable output member 260 of the electric machine 254, and locking members 262 in pockets of the pocket plate 258 by cooperating splines, keyed connection, or in any other suitable manner, and selectively engageable with notches of the notch plate 256. The wheel hub clutch 252 also includes a control assembly 264 to selectively engage the pocket plate 258 to the notch plate 256 via the locking members 262 as previously described or in any other suitable manner and/or configuration. The electric machine 254 includes a stator 266 fixed with respect to the hub body 40, an armature 267 rotatable with respect to the stator 266, and the rotatable output member 260 fixed to the armature 267 and rotatable with respect to the stator 266 and fixed to the pocket plate 258. The wheel hub clutch 252 may be axially trapped between the hub body 40 and the electric machine 254 via bolts or threaded studs 268 extending through fixed portions of the electric machine 254 and the wheel hub clutch 252 and threaded to the outboard axial end 60 of the wheel hub body 40, with bolt heads or separate nuts 270 coupled against an outboard surface of the electric machine 254. The electric machine 254 may be carried on the spindle 86', for example, wherein a fixed portion 272 of the electric machine 254 may be supported on an outboard portion 94' of the spindle 86'. In an embodiment, the electric machine 254 may be an electric motor and, along with the wheel hub clutch 252, both may be activated and controlled in any suitable manner to selectively drive the wheel hub 32', for example, to tractively drive wheels of a vehicle that includes the wheel end system 250. In another embodiment, the electric machine 254 may be an electric generator and, along with the wheel hub clutch 252, both may be activated and controlled in any suitable manner to selectively regeneratively brake vehicle wheels. Although not shown, a hub cover plate may be coupled at an outboard axial end of the system 250, for example, via the studs 268 and nuts 270, or in any other suitable manner.

Figure 8:
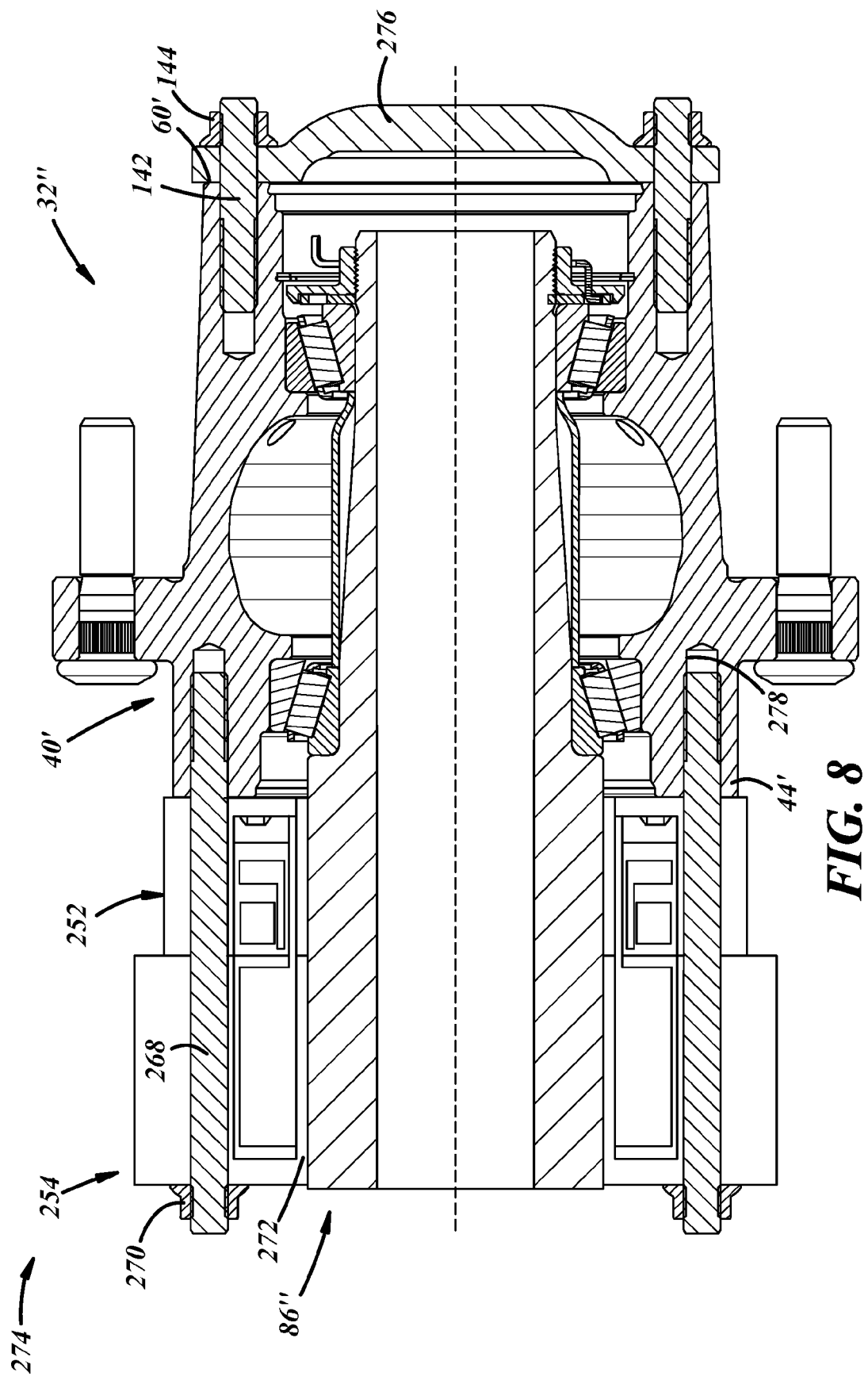
FIG. 8 is a schematic sectional view of a further illustrative embodiment of a further new wheel end system, including a further new wheel end hub, according to the present disclosure.

With reference now to FIG. 8, an additional wheel end system 274 is shown in accordance with an additional embodiment of the present disclosure. This embodiment is similar to the embodiment of FIG. 7, except that the wheel hub clutch 252 and the electric machine 254 are located on an inboard side of the system 274 as will be described below. The system 274 includes most of the wheel hub 32 of FIG. 5, except, for example, a wheel hub body 40' has a radially thicker inboard axial end 44', a spindle 86" is modified to be longer than the spindle 86 of FIG. 5, extending much further beyond the inboard axial end 44' of the wheel hub body 40', and a hub cover 276 is fastened to an outboard axial end 60' of the hub body 40' by fasteners, for example, the threaded studs 142 and nuts 144. The system 274 additionally includes the wheel hub clutch 252 coupled to the inboard axial end 44' of the wheel hub body 40', and the electric machine 254 at an inboard end of the system 274, specifically at an inboard side of the wheel hub clutch 252 and coupled to the wheel hub clutch 252 to drive a wheel hub 32" via selective activation of the wheel hub clutch 252. The wheel hub clutch 252 may be axially trapped between the hub body 40' and the electric machine 254 via the bolts or threaded studs 268 extending through fixed portions of the electric machine 254 and the wheel hub clutch 252 and threaded to into fastener passages 278 of the axial inboard end 44' of the wheel hub body 40', with bolt heads or separate nuts 270 coupled against an inboard surface of the electric machine 254. The electric machine 254 may be carried on the spindle 86", for example, wherein the fixed portion 272 of the electric machine 254 may be supported on an inboard portion of the spindle 86". In an embodiment, the electric machine 254 may be an electric motor and, along with the wheel hub clutch 252, both may be activated and controlled in any suitable manner to selectively drive the wheel hub 32", for example, to tractively drive wheels of a vehicle that includes the system 274. In another embodiment, the electric machine 254 may be an electric generator and, along with the wheel hub clutch 252, both may be activated and controlled in any suitable manner to selectively regeneratively brake vehicle wheels.

Figure 9:
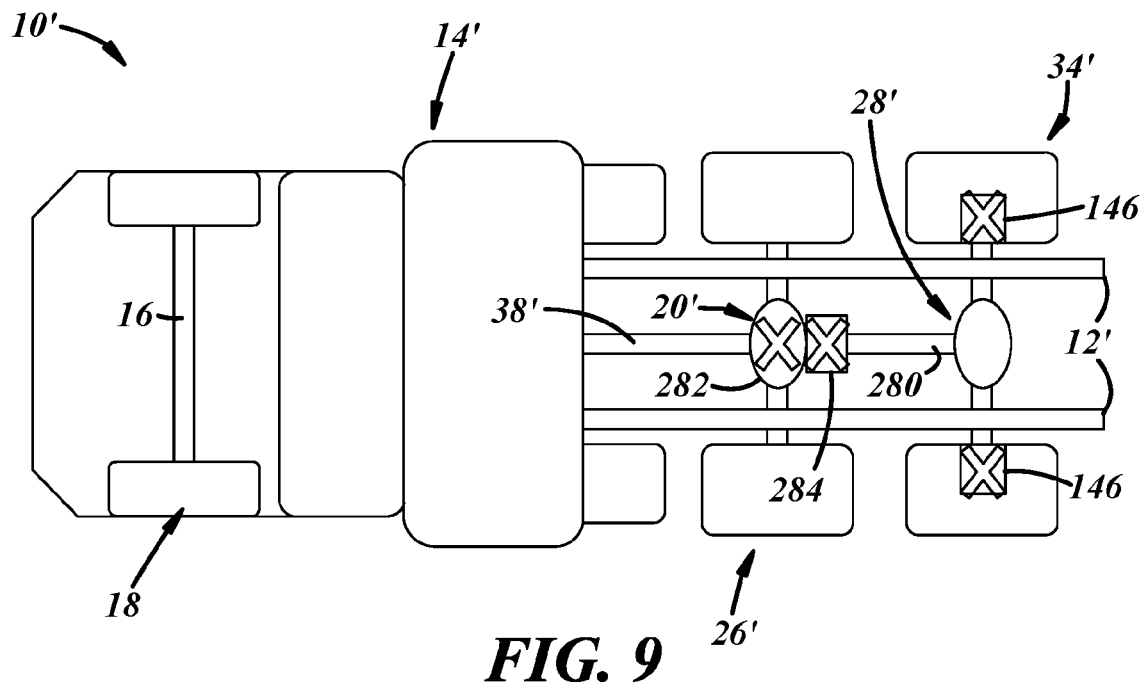
FIG. 9 is a schematic plan view of a vehicle having tandem coupled rear axles according to an illustrative embodiment of the present disclosure.

With reference now to FIG. 9, a vehicle, for example, the truck 10' of FIG. 2, includes a chassis 12', a cab or body 14' on the chassis 12', the front axle 16 and corresponding front wheels 18, and tandem coupled driven rear axles 20', 28' coupled to the chassis 12' and corresponding rear wheels 26', 34'. A first or driven primary rear axle 20' may be driven by an engine (not shown) via a first or primary rear axle prop shaft 38' drivingly coupled to the axle 20', and corresponding primary rear wheels 26' are driven by the driven primary rear axle 20'. A second or driven secondary rear axle 28' may be driven by the engine via the driven primary rear axle 20' via an inter-axle prop shaft 280, and corresponding secondary rear wheels 34' are driven by the driven secondary rear axle 28'. Each axle 20', 28' may include its own differential to allow corresponding left and right wheels to rotate at different speeds. But the driven primary rear axle 20' also may include a lockable inter-axle differential 282 to allow the primary and secondary axles 20', 28' to rotate at different speeds. The lockable inter-axle differential 282 may be activated to be locked to prevent loss of tractive power if one axle gets high sided and loses traction. The truck 10' also has wheel hub clutches 146 coupled between the secondary axle 28' and the corresponding secondary wheels 34'. The wheel hub clutches 146 may be those presently disclosed with respect to previously presented embodiments, or any other suitable wheel hub clutches.

But disengagement of the wheel hub clutches 146 alone will not suffice when the primary axle 20' alone is driven because the secondary wheels 34' would be back driven by engagement with a road and, thus, the secondary wheels 34' would continue to rotate at the same speed of the primary wheels 26' and, if the inter-axle prop shaft 280 is engaged, then the components of the secondary axle 28' would continue to rotate, such that no efficiencies would be realized. Therefore, the truck 10' also includes an inter-axle disconnect or clutch 284 that can be activated to disconnect the inter-axle prop shaft 280, and the wheel hub clutches 146 can be activated to disconnect the secondary wheels 34' from the secondary axle 28' and, thereby, rotation of the components of the secondary axle 28' ceases. In that case, there will be no tractive force on the downstream side of the inter-axle differential 282 such that torque will flow so as to merely rotate a downstream free end of the inter-axle differential 282 and so that torque will flow through the primary axle 20' to the primary wheels 26' with no unnecessary rotation of the components of the secondary axle 28'. Accordingly, the inter-axle differential 282 must be locked (as shown with an X) before the inter-axle disconnect 284 can be activated (as shown with an X). Ordinarily, an inter-axle differential is locked only when a vehicle is stationary or at vehicle speeds below 25 miles per hour. But if the primary axle 20' is coupled to the primary wheels 26' via wheel hub clutches, for example, via the presently disclosed wheel hub clutches 146, and, thus, can be disconnected from the primary wheels 26' by activating such wheel hub clutches, then it is possible to lock the inter-axle differential 282 at vehicle speeds above 25 miles per hour.

Figure 10:
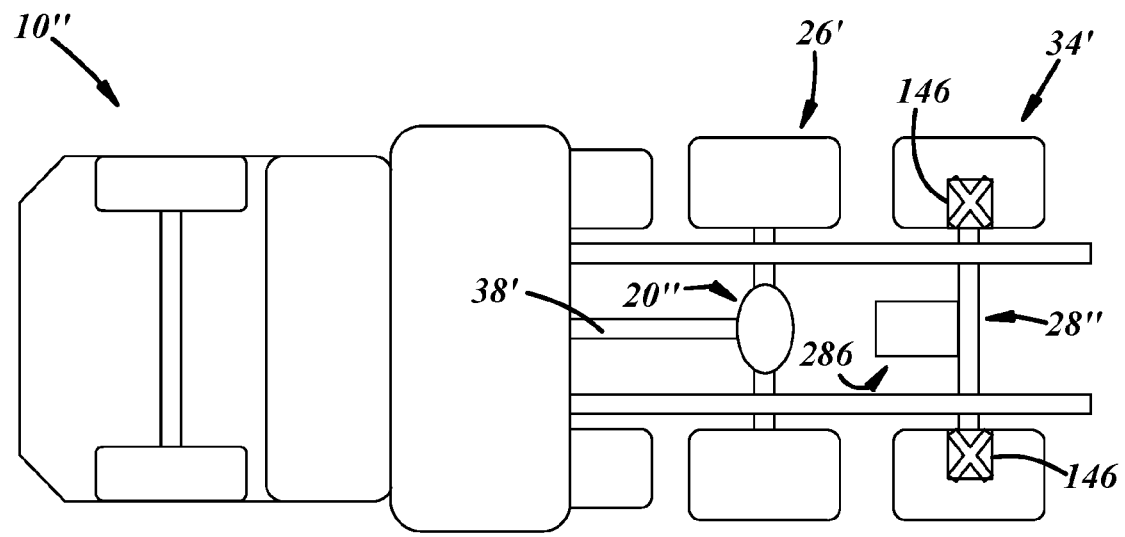
FIG. 10 is a schematic plan view of a vehicle having uncoupled rear axles according to an illustrative embodiment of the present disclosure.

With reference now to FIG. 10, a vehicle, such as the truck 10" of FIG. 2, shares some similarities with the previously described truck 10' of FIG. 9, but does not include the tandem driven rear axles of FIG. 9. Instead, the truck 10" includes independent driven rear axles including a first or primary rear axle 20" and corresponding primary rear wheels 26' and the prop shaft 38' drivingly coupled to the primary rear axle 20", and a second or secondary rear axle 28" and corresponding secondary rear wheels 34' driven by the axle 28". The truck 10" also may include an electric machine, for example, an electric motor 286 drivingly coupled to the second rear axle 28" to drive the secondary rear wheels 34'. The truck 10" also includes the wheel hub clutches 146 coupled between the secondary rear wheels 34' and the secondary rear axle 28". The wheel hub clutches 146 may be those presently disclosed with respect to previously presented embodiments, or any other suitable wheel hub clutches.

As used in herein, the terminology "for example," "e.g.," "for instance," "like," "such as," "comprising," "having," "including," and the like, when used with a listing of one or more elements, is to be construed as open-ended, meaning that the listing does not exclude additional elements. Also, as used herein, the term "may" is an expedient merely to indicate optionality, for instance, of a disclosed embodiment, element, feature, or the like, and should not be construed as rendering indefinite any disclosure herein. Moreover, directional words such as front, rear, top, bottom, upper, lower, radial, circumferential, axial, lateral, longitudinal, vertical, horizontal, transverse, and/or the like are employed by way of example and not necessarily limitation.

Finally, the subject matter of this application is presently disclosed in conjunction with several explicit illustrative embodiments and modifications to those embodiments, using various terms. All terms used herein are intended to be merely descriptive, rather than necessarily limiting, and are to be interpreted and construed in accordance with their ordinary and customary meaning in the art, unless used in a context that requires a different interpretation. And for the sake of expedience, each explicit illustrative embodiment and modification is hereby incorporated by reference into one or more of the other explicit illustrative embodiments and modifications. As such, many other embodiments, modifications, and equivalents thereto, either exist now or are yet to be discovered and, thus, it is neither intended nor possible to presently describe all such subject matter, which will readily be suggested to persons of ordinary skill in the art in view of the present disclosure. Rather, the present disclosure is intended to embrace all such embodiments and modifications of the subject matter of this application, and equivalents thereto, as fall within the broad scope of the accompanying claims.

The invention claimed is:

1. A wheel hub clutch for a wheel hub, comprising:
a selectively rotatable notch plate including a plurality of notches and a wheel hub mounting portion radially outward of the plurality of notches;
a rotatable pocket plate selectively engageable with the selectively rotatable notch plate and including a plurality of pockets corresponding to the plurality of notches of the selectively rotatable notch plate, and a plurality of plunger passages in communication with the plurality of pockets; and
a plurality of locking members in the plurality of pockets of the pocket plate and selectively engageable with the plurality of notches of the selectively rotatable notch plate.

2. The wheel hub clutch of claim 1, further comprising:
a plurality of plungers carried in the plurality of plunger passages of the pocket plate;
a stator including at least one electromagnet; and
a translator rotatable about and translatable along a rotational axis and coupled to the pocket plate to be rotatable therewith, and including
a translator hub coupled to the plurality of plungers, and
a permanent magnet carried by the translator hub and that cooperates with the at least one electromagnet of the stator to translate the translator to drive the plurality of locking members into engagement with the plurality of notches of the notch plate to transmit torque between the notch plate and the rotatable pocket plate.

3. The wheel hub clutch of claim 2, wherein the translator hub has a main body and a plunger flange extending radially outwardly from the main body and coupled to the plurality of plungers.

4. The wheel hub clutch of claim 3, wherein the plurality of plungers consists of a plurality of springs.

5. The wheel hub clutch of claim 2, further comprising:
a clutch hub fixed against rotation to the pocket plate and configured to be fixed against rotation to an axle shaft, and
an outboard bearing disposed between an outboard portion of the clutch hub and a corresponding portion of the notch plate,
wherein the translator is carried radially outward of the clutch hub.

6. The wheel hub clutch of claim 1, wherein the wheel hub mounting portion of the notch plate is configured to be fastened to a wheel hub body of the wheel hub.

7. The wheel hub clutch of claim 6, wherein the wheel hub mounting portion of the notch plate has a circumferential array of fastener passages extending therethrough to accommodate a plurality of fasteners extending through and configured to fasten to the wheel hub body of the wheel hub.

8. The wheel hub clutch of claim 6, wherein the wheel hub mounting portion of the notch plate is configured to be coupled to an inboard end of the wheel hub body of the wheel hub.

9. The wheel hub clutch of claim 8, wherein an inboard end of the wheel hub clutch is configured to be coupled to an electric motor positioned inboard of the wheel hub clutch.

10. The wheel hub clutch of claim 6, wherein the pocket plate is axially retained with respect to the selectively rotatable notch plate.

11. The wheel hub clutch of claim 6, wherein the wheel hub mounting portion of the notch plate is configured to be coupled to an outboard end of the wheel hub body of the wheel hub.

12. The wheel hub clutch of claim 11, wherein an outboard end of the wheel hub clutch is configured to be coupled to an electric motor positioned outboard of the wheel hub clutch.

13. The wheel hub clutch of claim 2, wherein the notch plate further includes
an outboard bearing journal radially inward of the plurality of notches, and
a hub cover portion radially inward of the outboard bearing journal and extending radially continuously across the rotational axis.

14. The wheel hub clutch of claim 2, further comprising:
a stator support including
an outboard portion coupled to the stator, and
an inboard bearing journal.

15. The wheel hub clutch of claim 14, further comprising:
a clutch hub having
an interior surface with engagement features,
an inboard bearing journal and an outboard bearing journal,
a translator journal wherein the translator hub is slidable along the translator journal, and
pocket plate engagement features between the translator journal and the outboard bearing journal, and engaged with corresponding engagement features of the pocket plate to fix the clutch hub to the pocket plate against rotation, and
an inboard bearing carried between the inboard bearing journals of the clutch hub and the stator support.

16. The wheel hub clutch of claim 15, wherein the notch plate further includes
an outboard bearing journal radially inward of the plurality of notches, and
a hub cover portion radially inward of the outboard bearing journal and extending radially continuously across the rotational axis.

17. The wheel hub clutch of claim 16, further comprising:
an outboard bearing carried between the outboard bearing journals of the clutch hub and the notch plate.

18. A vehicle powertrain, comprising:
the wheel hub clutch of claim 1; and
an electric motor operatively coupled to the pocket plate of the wheel hub clutch.

19. A truck comprising the vehicle powertrain of claim 18.

20. A wheel end system, comprising:
a wheel hub, including:
a wheel hub body having
a hub inboard portion with a hub inboard interior surface including an inboard bearing journal, a hub outboard portion with a hub outboard facing surface, and a hub outboard interior surface including an outboard bearing journal,
a spindle passage extending between the inboard and outboard portions along a longitudinal axis, and
a hub flange extending transversely outwardly from between the hub inboard and outboard portions and having wheel fastener passages extending therethrough;
an inboard bearing carried on the inboard bearing journal of the inboard portion of the wheel hub body of the wheel hub;
an outboard bearing carried on the outboard bearing journal of the outboard portion of the wheel hub body of the wheel hub; and
the wheel hub clutch of claim 1, wherein the selectively rotatable notch plate is coupled to the wheel hub body.

21. The wheel end system of claim 20, further comprising:
a hollow spindle, including
a spindle inboard portion having an inboard bearing journal, and
a spindle outboard portion having an outboard exterior surface with an outboard bearing journal and a spindle nut diameter having spindle nut engagement features and terminating in a spindle outboard facing surface,
wherein the wheel hub also includes a spindle nut having spindle engagement features engaged to the spindle nut engagement features of the spindle.

22. A wheel end system, comprising:
a wheel hub including
a wheel hub body having
a hub outboard portion with a hub outboard facing surface having fastener passages therein, and
a spindle passage, and
a hub flange extending transversely outwardly and having wheel fastener passages extending therethrough;
a wheel hub clutch including:
a selectively rotatable first coupling member including a plurality of locking features, and a wheel hub mounting portion radially outward of the plurality of locking features and coupled to the hub outboard portion of the hub,
a rotatable second coupling member selectively engageable with the selectively rotatable first coupling member and including a plurality of pockets corresponding to the plurality of locking features of the selectively rotatable first coupling member, and a plurality of passages in communication with the plurality of pockets, and
a plurality of locking members in the plurality of pockets of the rotatable second coupling member and selectively engageable with the plurality of locking features of the selectively rotatable first coupling member; and
an axle shaft extending through the spindle passage along a rotational axis and including an outboard portion fixed against rotation with respect to the rotatable second coupling member.

23. A vehicle drivetrain, comprising:
the wheel end system of claim 22;
a first rear axle;
a first rear axle prop shaft drivingly coupled to the first rear axle;
a second rear axle including the axle shaft of claim 22; and
a second rear axle electric motor drivingly coupled to the second rear axle.

24. A vehicle drivetrain, comprising:
the wheel end system of claim 22;
a first rear axle;
a first rear axle electric motor drivingly coupled to the first rear axle;
a second rear axle including the axle shaft of claim 22; and
a second rear axle electric motor drivingly coupled to the second rear axle.

25. A vehicle drivetrain, comprising:
the wheel end system of claim 22;
a first rear axle including a lockable inter-axle differential;
a first rear axle prop shaft drivingly coupled to the first rear axle;
a second rear axle including the axle shaft of claim 22;
an inter-axle prop shaft drivingly coupled between the first and second rear axles; and
an inter-axle clutch to couple and decouple the second rear axle from the first rear axle.

26. A wheel end system including
a wheel hub including
  a wheel hub body having
    a spindle passage extending along a longitudinal axis, and
    a hub flange extending transversely outwardly from the wheel hub body and having wheel fastener passages extending therethrough, and
  a spindle nut system;
a hollow spindle extending into the wheel hub body and coupled to the spindle nut system;
an axle shaft extending through the hollow spindle along a rotational axis and including an outboard portion with engagement features; and
a wheel hub clutch rotatable about the rotational axis and releasably coupling the axle shaft and the wheel hub body, and including
  a coupling assembly, including
    a first coupling member selectively rotatable about the rotational axis and including
      a first face having a plurality of locking features,
    a second coupling member rotatable about the rotational axis and including
      a second face in opposition with the first face of the first coupling member and having a plurality of pockets,
      a third face spaced from the second face and having a plurality of passages in communication with the plurality of pockets,
    a plurality of locking members in the pockets to transmit torque between the first and second coupling members,
    a clutch hub having an interior surface with axle shaft engagement features engaged with the engagement features of the axle shaft to fix the clutch hub to the axle shaft, and
  a control assembly, including
    a stator including at least one electromagnet,
    a stator support disposed radially outwardly from the clutch hub of the coupling assembly, being coupled to the spindle and to the stator to thereby hold the stator against rotation, and
    a translator rotatable about the rotational axis and coupled to the clutch hub to be rotatable therewith and with the second coupling member, translatable along the rotational axis, and including
      a translator hub having
        a main body with
          an interior surface slidable along a translator journal of the clutch hub, and
          an exterior surface including a permanent magnet journal at an inboard portion of the main body, and
        a plunger flange extending radially outwardly from the main body at an outboard portion of the main body,
      a permanent magnet carried by the translator hub and that cooperates with the at least one electromagnet of the stator to translate the translator, and
      plungers having free end portions configured to move within the passages to engage the locking members within the pockets to actuate the locking members upon translation of the translator.

27. The wheel end system of claim 26, wherein
the wheel hub includes
  a hub inboard portion with
    a hub inboard facing surface,
    a hub inboard exterior surface extending in a direction away from the inboard facing surface, and
    a hub inboard interior surface extending in a direction away from the inboard facing surface and including a seal pocket and an inboard bearing pocket including an inboard bearing journal and an inboard bearing flange extending transversely inwardly from the wheel hub body, and
  a hub outboard portion with
    a hub outboard facing surface having fastener passages therein,
    a hub outboard exterior surface extending in a direction away from the outboard facing surface, and
    a hub outboard interior surface extending in a direction away from the outboard facing surface and including an outboard bearing pocket including an outboard bearing journal and an outboard bearing flange extending transversely inwardly from the wheel hub body, and
wherein the spindle passage extends between the hub inboard and outboard portions and including a grease cavity between the inboard and outboard bearing flanges.

28. The wheel end system of claim 27, wherein
the wheel hub further includes
  a speed sensor ring coupled to the inboard facing surface of the inboard portion of the wheel hub body,
  an inboard bearing carried by the inboard bearing journal of the inboard portion of the wheel hub body of the wheel hub,
  an outboard bearing carried in the outboard bearing pocket of the outboard portion of the wheel hub body of the wheel hub, and
  a bearing spacer located between the inboard and outboard bearings, and
the spindle nut system includes
  a spindle nut having a hub with a cylindrical portion having spindle engagement features and a wrench flat portion having a lock ring flange, and a lock washer flange extending transversely outwardly from the spindle nut hub and having a lock ring relief therein,
  a nut retaining spiral snap ring coupled to the outboard portion of the wheel hub via an annular groove in the outboard interior surface of the outboard portion of the wheel hub to trap the lock washer flange of the spindle nut between the snap ring and the outboard bearing, a lock washer trapped between the lock washer flange of the spindle nut and the outboard bearing and having a spindle engagement feature and a circumferential array of lock ring apertures, and a lock ring trapped between the lock ring flange and the lock washer flange of the spindle nut and having a lock washer engagement feature extending through the lock ring relief and into one of the lock ring apertures of the lock washer.

29. The wheel end system of claim 28, wherein the spindle includes a spindle inboard portion having an inboard bearing shoulder and an inboard exterior surface extending in a direction away from the inboard bearing shoulder with an inboard bearing journal, a spindle outboard portion having an outboard exterior surface with an outboard bearing journal and a spindle nut diameter having spindle nut engagement features coupled to the spindle engagement features of the spindle nut, and terminating in a spindle outboard facing surface that is axially recessed with respect to the wheel hub outboard facing surface, and a spindle intermediate portion having a tapered exterior surface.

30. The wheel end system of claim 26, wherein the second coupling member is axially retained with respect to the first coupling member, and the first coupling member includes a notch plate portion carrying the plurality of locking features, a mounting cylinder portion radially outward of the notch plate portion and having fastener passages extending therethrough, an outboard bearing pocket radially inward of the notch plate portion, and a hub cover portion radially inward of the notch plate portion and extending radially continuously across the rotational axis.

* * * * *